(12) United States Patent
Acharya Chandrashekar et al.

(10) Patent No.: US 12,609,985 B2
(45) Date of Patent: Apr. 21, 2026

(54) DYNAMIC REBALANCING OF CONTAINERIZED APPLICATION CLUSTER

(71) Applicant: International Business Machines Corporation, Armonk, NY (US)

(72) Inventors: Charan Acharya Chandrashekar, Bangalore (IN); Hemant Kumar Sivaswamy, Bangalore (IN); Raja Rahul, Visakhapatnam (IN); Arashad Ahamad, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 18/429,981

(22) Filed: Feb. 1, 2024

(65) Prior Publication Data

US 2025/0254209 A1 Aug. 7, 2025

(51) Int. Cl.
*G06F 15/16* (2006.01)
*H04L 67/1008* (2022.01)
*H04L 67/1012* (2022.01)
*H04L 67/1087* (2022.01)

(52) U.S. Cl.
CPC ...... *H04L 67/1008* (2013.01); *H04L 67/1012* (2013.01); *H04L 67/1091* (2013.01)

(58) Field of Classification Search
CPC ............. H04L 67/1008; H04L 67/1012; H04L 67/1091
USPC ......................................................... 709/203
See application file for complete search history.

(56) References Cited

U.S. PATENT DOCUMENTS

| | | | | |
|---|---|---|---|---|
| 10,660,111 B2 * | 5/2020 | Fanelli | ................. | H04W 72/543 |
| 10,747,568 B2 * | 8/2020 | Ahmed | ............... | H04L 41/0816 |
| 10,824,489 B2 | 11/2020 | Caldato et al. | | |
| 11,029,993 B2 * | 6/2021 | Jawahar | .................. | G06F 9/455 |
| 11,076,328 B2 * | 7/2021 | Lu | .......................... | H04W 24/10 |
| 11,127,071 B2 * | 9/2021 | Rodriguez Bravo | ......................... G05D 1/0808 | |
| 11,265,749 B2 * | 3/2022 | Zhang | .................... | H04W 80/02 |
| 11,368,409 B2 * | 6/2022 | Yilma | ................... | H04W 24/02 |
| 11,432,302 B2 * | 8/2022 | Fanelli | .................. | H04B 7/18504 |
| 11,443,639 B2 * | 9/2022 | Huang | ..................... | G08G 5/32 |
| 11,653,276 B2 * | 5/2023 | Lu | .......................... H04W 36/00 455/440 | |
| 11,658,918 B2 * | 5/2023 | Vedam | ..................... H04L 43/10 370/235 | |
| 11,758,577 B2 * | 9/2023 | Fanelli | .................. H04W 4/024 370/329 | |

(Continued)

OTHER PUBLICATIONS

Arkian, H.R., et al., "A cluster-based vehicular cloud architecture with learning-based resource management", J Supercomput, Published online Jan. 7, 2015, 7 pages.

(Continued)

*Primary Examiner* — Alicia Baturay
(74) *Attorney, Agent, or Firm* — Scully, Scott, Murphy & Presser, P.C.; Aaron Pontikos

(57) ABSTRACT
A moving server containerized application cluster can be dynamically rebalanced. Future incoming workload to a first moving server containerized application cluster is determined. Based on the future incoming workload, at least one worker node is requested from a peer moving server containerized application cluster. At least one worker node is caused to migrate from the peer moving server containerized application cluster to the first moving server containerized application cluster.

17 Claims, 6 Drawing Sheets

(56) References Cited

U.S. PATENT DOCUMENTS

| | | | | |
|---|---|---|---|---|
| 12,052,182 | B2 * | 7/2024 | Vedam | H04L 47/83 |
| 2015/0379874 | A1 * | 12/2015 | Ubhi | G08G 5/59 |
| | | | | 701/3 |
| 2018/0349168 | A1 * | 12/2018 | Ahmed | G06N 3/0464 |
| 2022/0038554 | A1 | 2/2022 | Merwaday et al. | |
| 2022/0219697 | A1 * | 7/2022 | Bucher | B60W 30/188 |
| 2022/0397917 | A1 | 12/2022 | Arksey et al. | |
| 2023/0153142 | A1 * | 5/2023 | Shabah | G06F 9/4881 |
| | | | | 718/1 |
| 2023/0344804 | A1 * | 10/2023 | Thyagaturu | H04L 63/0428 |
| 2025/0004885 | A1 * | 1/2025 | Pabón | G06F 11/1458 |

OTHER PUBLICATIONS

Chen, Z., et al., "Joint computation offloading and deployment optimization in multi-UAV-enabled MEC systems", Peer-to-Peer Networking and Applications (2022), Accepted Sep. 9, 2021, Published online Sep. 25, 2021, pp. 194-205, 15.

Disclosed Anonymously, "Method to Dynamically Toggle the State of an Edge Server Integrated into a UAV", An IP.com Prior Art Database Technical Disclosure, IP.com No. IPCOM000272702D, IP.com Electronic Publication Date Jul. 18, 2023, 8 pages.

Elgendy, I.A., et al., "Joint Task Offloading, Resource Allocation, and Load-Balancing Optimization in Multi-UAV-Aided MEC Systems", Appl. Sci. 2023, Revised Feb. 10, 2023, Accepted Feb. 15, 2023, Published Feb. 17, 2023, 22 pp. 13, 2625.

Khedkar, S.P., et al., "Prediction of Traffic Generated by IoT Devices Using Statistical Learning Time Series Algorithms", Wireless Communications and Mobile Computing, Accepted Jul. 19, 2021, Published Aug. 2, 2021, 12 pages, vol. 2021, Article ID 5366222.

KubeEdge Maintainers, "KubeEdge@MEC: Combining the Kubernetes ecosystem with 5G", https://www.cncf.io/blog/2021/07/20/kubeedgemec-combining-the-kubernetes-ecosystem-with-5g/, Jul. 20, 2021, 9 pages.

Kubernetes, "kubeadm join", https://kubernetes.io/docs/reference/setup-tools/kubeadm/kubeadm-join/, Last modified May 16, 2023, 7 pages.

Kubernetes, "Safely Drain a Node", https://kubernetes.io/docs/tasks/administer-cluster/safely-drain-node/, Last modified May 11, 2023, 2 pages.

Seisa, A.S., et al., "A Kubernetes-Based Edge Architecture for Controlling the Trajectory of a Resource-Constrained Aerial Robot by Enabling Model Predictive Control", computarXiv:2301.13624v1 [cs.RO], Jan. 31, 2023, 6 pages.

Yang, L., et al., "Multi-UAV Enabled Load-Balance Mobile Edge Computing for IoT Networks", IEEE Internet of Things Journal, Feb. 2020, 12 pages.

Zhang, Z., et al., "DECCo—A Dynamic Task Scheduling Framework for Heterogeneous Drone Edge Cluster", Drones 2023, Revised Jul. 26, 2023, Accepted Aug. 1, 2023, Published Aug. 3, 2023, 16 pages 7, 513.

Kouser, R.R., et al., "A novel clustering and optimal resource scheduling in vehicular cloud networks using MKMA and the CM-CSO algorithm", Int J Commun Syst. 2023, Revised Dec. 2, 2022, Accepted Dec. 13, 2022, pp. 1-18, 36:e5424.

* cited by examiner

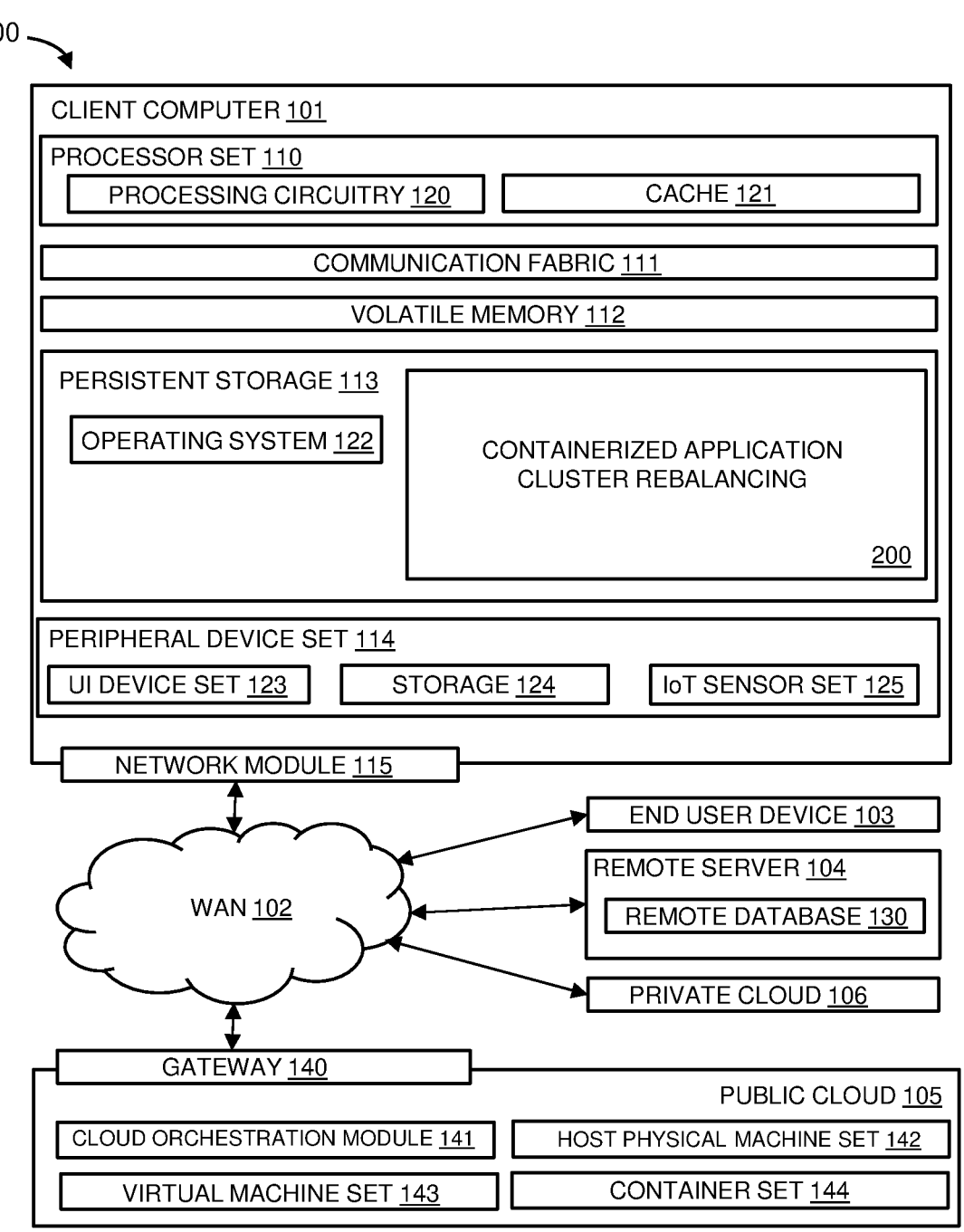

100

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122          CONTAINERIZED APPLICATION CLUSTER REBALANCING

200

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

FIG. 1

Determine Future Incoming Workload — 502

Request Worker Node — 504

Cause Migrating of Worker Node — 506

DYNAMIC REBALANCING OF CONTAINERIZED APPLICATION CLUSTER

BACKGROUND

The present application relates generally to computers and computer applications, and more particularly to moving servers in containerized application clusters.

BRIEF SUMMARY

The summary of the disclosure is given to aid understanding of a computer system and method of rebalancing of containerized application cluster, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method, in some embodiments, includes determining future incoming workload to a first moving server containerized application cluster. The computer-implemented method also includes requesting at least one worker node from a peer moving server containerized application cluster. The computer-implemented method also includes causing migrating of the at least one worker node from the peer moving server containerized application cluster to the first moving server containerized application cluster.

A computer system and a computer program product configured to achieve or cause the method described above are also disclosed herein.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 1 shows an example of a computing environment, which can implement rebalancing of containerized application cluster in some embodiments.

DETAILED DESCRIPTION

Figure 2:
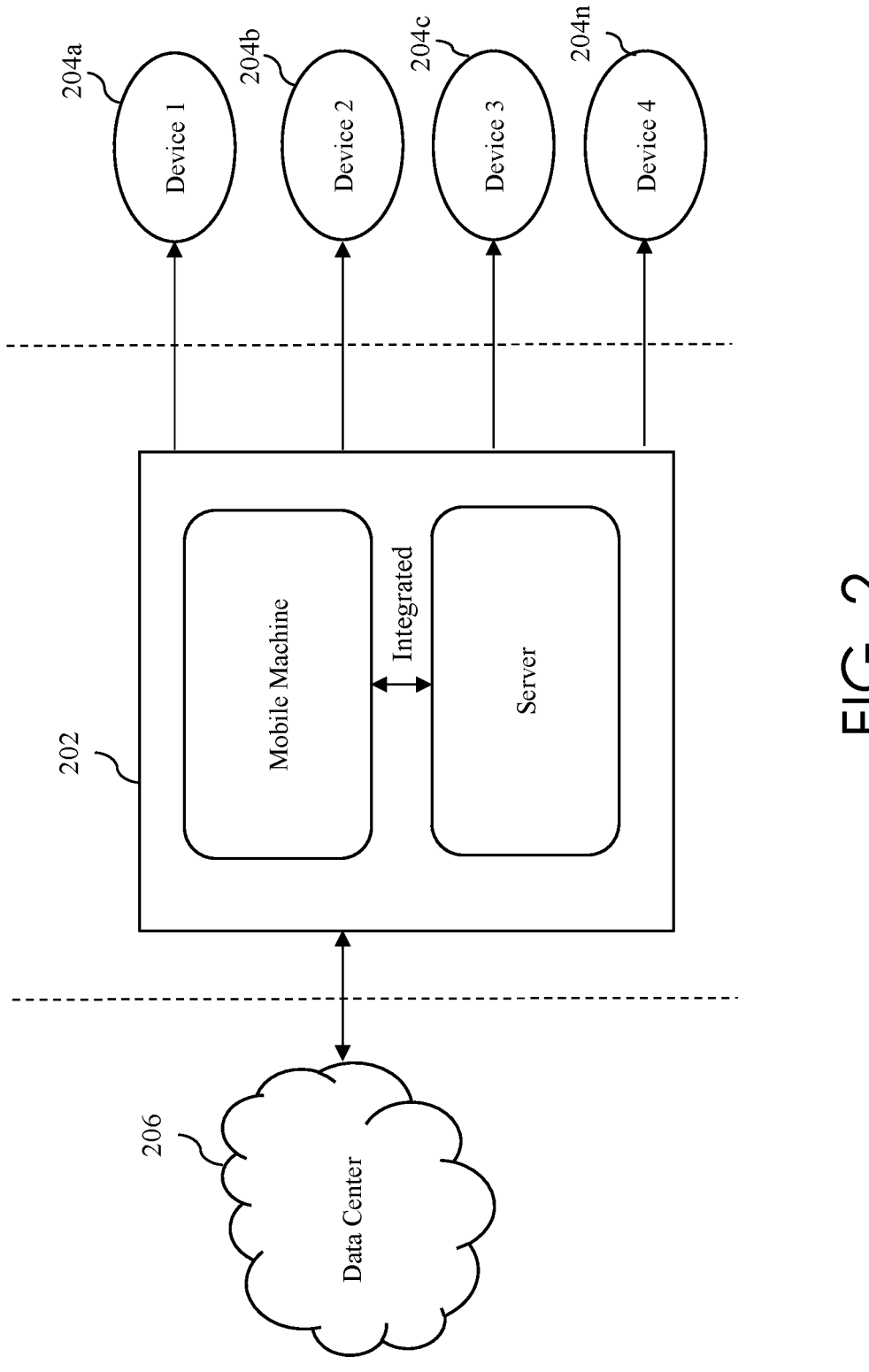
FIG. 2 is a diagram illustrating an overview of moving servers in some embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as containerized application cluster rebalancing algorithm code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future.

In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Systems and methods are disclosed in various embodiments, which can dynamically rebalance worker nodes (e.g., function as moving servers such as moving edge servers used in edge computing) in a containerized application cluster. A containerized application cluster is a group of worker nodes (computing nodes or machines) that run containerized applications. Briefly, containerization packages software code with operating system (OS) libraries and dependencies used to run the code to create an executable (called a container) that runs on any infrastructure. An example of a containerized application cluster is a Kubernetes cluster. A moving server containerized application cluster is a group of worker nodes (physical machines) functioning as moving servers running containerized applications. A moving server containerized application cluster (also referred to as a first containerized application cluster for simplicity of explanation) requests one or more worker nodes (or at least one worker node) from a peer moving server containerized application cluster. A worker node in a moving server containerized application cluster is a moving server. For example, a worker node in a moving server containerized application cluster is a moving edge server, e.g., a mobile device capable of performing edge server functions at an edge location, for example, close to where the actual data sources such as physical sensors are located. At least one worker node is then physically migrated to the requesting (or first) moving server containerized application cluster from the peer moving server containerized application cluster.

In some embodiments, a machine learning model determines the future incoming load to the first moving server containerized application cluster and identifies additional resource needed in the first moving server containerized application cluster to service the further incoming load.

In some embodiments, the first moving server containerized application cluster receives an identification of at least one worker node, at least one worker node having been identified based on the peer moving server containerized application cluster's evaluation of the at least one worker node's current and future load, distance to be travelled between the first moving server containerized application cluster and the peer moving server containerized application cluster, battery remaining in the at least one worker node, energy required to drain the at least one worker node, and at least one hardware pre-requisite.

In some embodiments, the first moving server containerized application cluster selects at least one worker node identified by the peer moving server containerized application cluster, based on at least a hardware pre-requisite, travel distance between the clusters, energy remaining in the at least one worker node to be released by the peer moving server containerized application cluster, and confirms the request to the peer moving server containerized application cluster.

In some embodiments, at least one worker node is drained and released from the peer moving server containerized application cluster prior to physically migrating the at least one worker node to the first moving server containerized application cluster, to add the worker node to the first moving server containerized application cluster.

FIG. 2 is a diagram illustrating an overview of moving servers in some embodiments. A moving server 202 is a mobile computing device that can be moved to a desired location and used as a server, for example, an edge server that can be used in edge computing, perform processing at an edge location where the data sources such as sensors or devices 204a, 204b, 204c, 204n are located. For example, a moving server 202 is a physical mobile machine running a server functionality in computing technology. For example, moving servers can be used when it is not possible to install conventional servers such as edge servers, for instance, in areas such as where rescue operations are taking place, farms, desserts, and/or the like. One or more moving servers 202 can be deployed in such a location and retrieve data from or communicate with physical sensors or devices 204a, 204b, 204c, 204n, which are physically present at the location. For example, one or more moving servers 202 move, transport or fly closer to devices 204a, 204b, 204c, 204n such as IoT devices and process the data that is generated and/or collected by those devices 204a, 204b, 204c, 204n. One or more moving servers 202 also communicate with central server such as a base station and/or cloud server 206.

Moving servers as a containerized application cluster can be deployed in disaster-stricken areas to establish a communication network. Moving servers in a containerized application cluster can be used in agriculture setting to monitor crop health, collect data on soil conditions, and perform targeted pesticide spraying. Moving servers in a containerized application cluster can be employed for inspecting critical infrastructure such as power lines, bridges, and pipelines. Moving servers in a containerized application cluster can monitor traffic flow, detect congestion, and provide real-time data to traffic management centers. In search and rescue missions, moving servers in a containerized application cluster can rapidly cover large areas and transmit high-definition video feeds to ground-based rescue teams.

Figure 3:
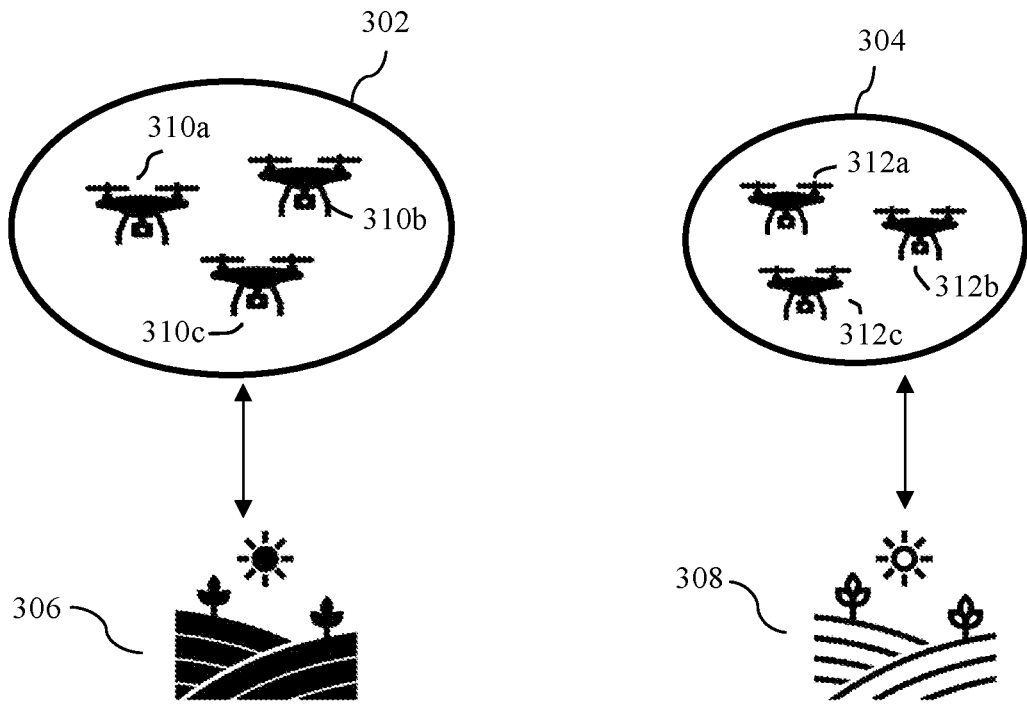
FIG. 3 is a diagram illustrating moving servers providing services arranged in different containerized application clusters in some embodiments.

FIG. 3 is a diagram illustrating moving servers providing services arranged in different containerized application clusters in some embodiments. Multiple moving server containerized application clusters 302, 304 can be deployed to different target locations 306, 308. A plurality of moving servers (also referred to as worker nodes) 310a, 310b, 310n form a single cluster 302. Similarly, a plurality of moving servers (also referred to as worker nodes) 312a, 312b, 312n form a single cluster 304. Different clusters 302, 304 may have same or different applications installed on it based on the need. Single cluster 302 can also have multiple different applications running on it, for example, a moving server 310a running a different application from a moving server 310b. Similarly, single cluster 304 can also have multiple different applications running on it, for example, a moving server 312a running a different application from a moving server 312b. Input load to each of the cluster 302, 304 can vary based on the number of devices such as edge devices connected to the cluster, amount of the data generated by the cluster and/or amount of service requested by the cluster. For instance, some requests can be central processing unit (CPU) intensive, and/or some may be memory intensive. When the incoming load exceeds the available capacity of the worker nodes (e.g., functioning as moving servers) in a cluster, incoming requests will have to wait or queue, which impacts the quality of service (QOS).

Various services can be provided by moving servers during situations like traffic congestion, disaster and rescue operation, monitoring and/or collecting data from devices such as edge devices deployed on desserts, farms, and/or others. In some embodiments, by way of example, services that can be provided by moving servers include, but are not limited to, capturing of normal and/or thermal images, analyzing captured image images and handling the situation, providing communication network, relaying of data from one area to another, and/or collecting and processing data from devices such as edge devices or IoT sensors.

In some embodiments, architectural model for moving servers include a plurality of worker nodes grouped as a containerized application cluster such as Kubernetes cluster, and deployed to a target location to provide a service. In some embodiments, each moving server (e.g., 310a, 310b, 310c) is considered as one worker node in the cluster (e.g., 302). Control plane of a cluster can be in a centralized data center or in one of the moving servers (worker nodes) deployed to a target location. Control plane manages worker nodes within a cluster, for example, communications within the cluster, resources, and task or job scheduling of worker nodes within the cluster. Each worker node (moving server) can provide multiple services based on its ability through containerized application deployed on to it.

Figure 4:
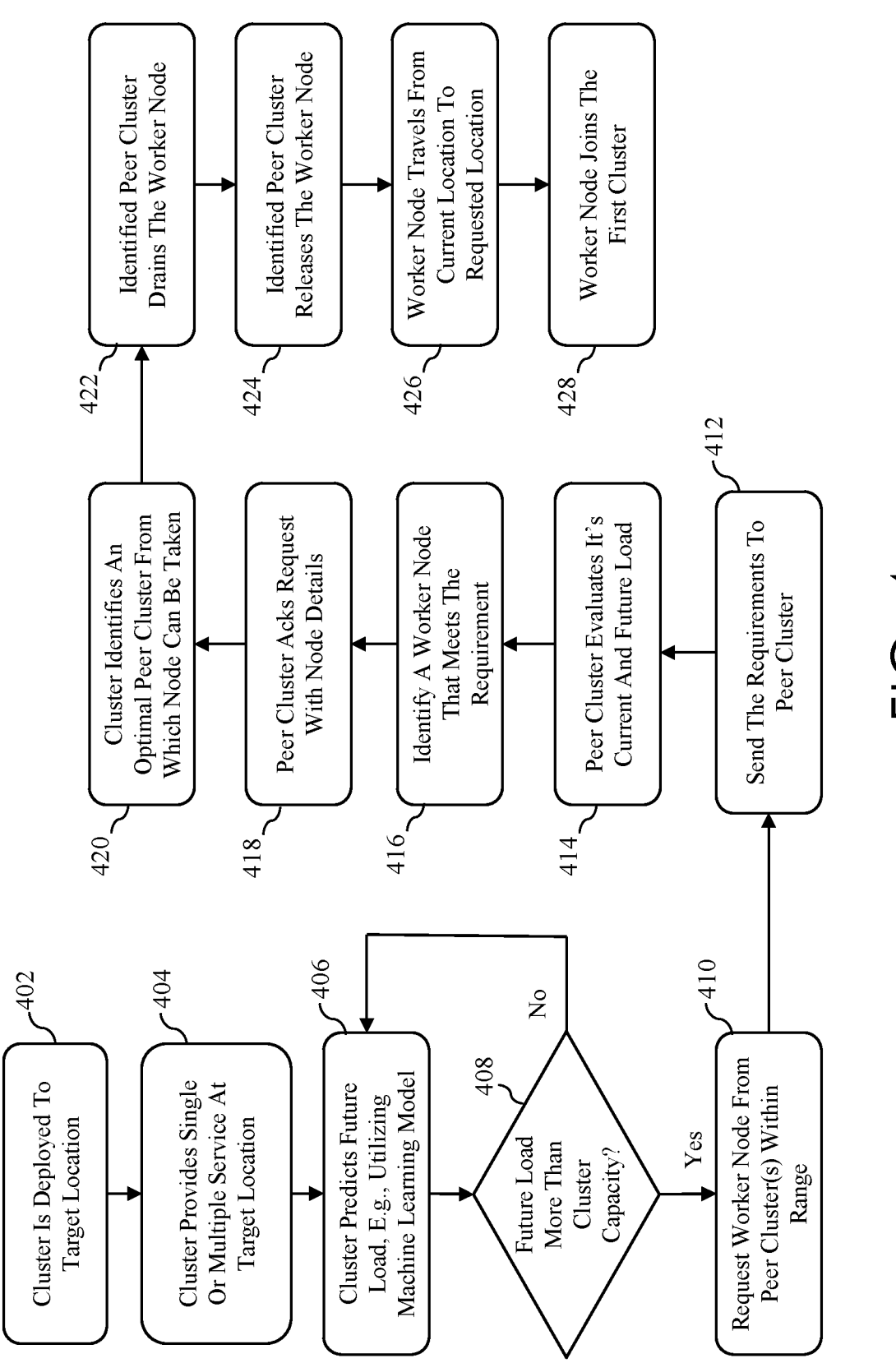
FIG. 4 is a flow diagram illustrating a method of dynamically rebalancing moving server containerized application cluster in some embodiments.

FIG. 4 is a flow diagram illustrating a method of dynamically rebalancing moving server containerized application cluster in some embodiments. Throughout the description, a moving server containerized application cluster is interchangeably also referred to as a cluster, for brevity and simplicity of explanation. At 402, a moving server containerized application cluster is deployed to a target location (referred to as a first moving server containerized application cluster or first cluster). For instance, as described above with reference to FIG. 2 and FIG. 3, a moving server containerized application cluster includes a plurality of worker nodes functioning as moving servers.

At 404, the first moving server containerized application cluster provides a single service or multiple services at the target location. Examples of services provided at the target location can include, but are not limited to, capturing and processing images of the target location and/or vicinities of the target location (and/or objects located in the target location and/or vicinities of the target location), providing data relay service between the target location and/or vicinities of the target location, and another location, providing communication network to ground users at the target location and/or vicinities of the target location, collecting data from IoT devices located in the target location and/or vicinities of the target location, and/or others.

At 406, the first moving server containerized application cluster determines future incoming workload. In some embodiments, a machine learning model is utilized that predicts the future load of the cluster. For example, a machine learning model such as an artificial neural network model, deep learning model, and/or another model trained based on another type of machine learning technique, is trained based on historical workload of containerized application clusters performing types of services the current cluster is performing in areas or locations similar to where the current cluster is located. Such a machine learning model predicts a future workload of the cluster. In some embodiments, future workload can be predicted at application or pod level and percolate up to the cluster. For instance, future workload can be predicted for each application or pod in the cluster, then summed up as the cluster's future workload. Briefly, a pod is a deployable unit and includes one or more containers, where each container represents a single application or service. Containers in a pod may share resources. A worker node implemented as a moving server can have a pod with one or more containers. A worker node is also referred to as a moving server worker node herein.

At 408, it is determined whether the future workload exceeds the workload amount that the first cluster can currently handle based on its current capacity. For example, using the predicted future workload for the first cluster, a control plane or like controller of the first cluster determines if the first cluster has enough resources to handle the predicted future workload. Examples of workload include, but are not limited to, requests to capture and process images, provide data relay service, provide communication network to ground users, collect data from IoT devices, and/or others. Examples of resources include, but are not limited to, CPU, memory, storage, processor, sensors, cameras, battery, and/or others.

Responsive to determining, e.g., by the control plane of the first cluster, that the first cluster has resource capacity for the predicted future workload, the processing continues to 406, where another determination is made as to the future incoming workload. For example, the first cluster may run a machine learning model periodically to determine its future workload.

Responsive to determining, e.g., by the control plane of the cluster, that the first cluster needs more resources to handle the predicted future workload, at 410, a request is sent to a peer moving server containerized application cluster within the first cluster's range. For example, a control plane of the first cluster (e.g., referred to also as a first moving server containerized application cluster) may communicate with a peer control plane of a peer moving server containerized application cluster. Peer moving server containerized application cluster is also referred to, interchangeably, as a peer cluster. At 412, the first cluster sends requirements associated with handling its workload to the peer cluster. For example, the first cluster sends information regarding the additional resources it would need to handle the future workload.

At 414, the peer moving server containerized application cluster evaluates its current and future workload, for example, to determine whether a worker node can be released, for example, for another cluster's use (e.g., for the first cluster's use). In some embodiments, responsive to receiving a request, the peer moving server containerized application cluster performs the one or more of the following checks: check the availability of requested resources in the peer cluster; check its own (the peer cluster's) current and future workload; check distance between the peer cluster and the cluster requesting the worker node (e.g., the first cluster); check energy required to drain any available to-be released moving server worker node; check energy and time required for any available to-be released moving server worker node to travel from its current location to the requesting cluster's location (e.g., the distance between the peer cluster and the first cluster). Briefly, draining removes or uninstalls applications and data from the to-be release moving server worker node.

At 416, based on the above analysis performed at 414, the peer moving server containerized application cluster identifies a moving server worker node that can be released (if available) and at 418 sends an acknowledgement to the first cluster, e.g., the requesting moving server containerized application cluster that is requesting a worker node, with details of the worker node to be released.

In some embodiments, the first moving server containerized application cluster may send requests for worker nodes to multiple peer moving server containerized application clusters, where each of the multiple peer moving server containerized application clusters performs the above described analysis (e.g., described with reference to 414) about its availability. Responsive to receiving acknowledgements from multiple peer moving server containerized application clusters, the first moving server containerized application cluster identifies one or more optimal clusters from which one or more worker nodes can be taken.

At 420, the first cluster identifies an optimal peer cluster from which one or more worker nodes can be taken. In some embodiments, optimal identification of cluster node can be done based on computing capacity, energy remaining, time to travel from a source location to the first moving server containerized application cluster's location, and/or others. For example, consider that there are three peer moving server containerized application clusters, where: i) in a first peer moving server containerized application cluster, there are worker nodes that takes 10 minutes to travel and can handle 100% of the predicted future load; ii) in second and third peer moving server containerized application clusters, there are worker nodes that take 15 minutes to travel and each can handle 60% of the predicted future workload. In this example scenario, the first moving server containerized application cluster selected the worker nodes from the first peer moving server containerized application cluster.

Consider another example where there are three peer clusters: i) in a first peer moving server containerized application cluster, there are worker nodes that takes 60 minutes to travel and can handle 100% of the future load; ii) in second and third peer moving server containerized application clusters, there are worker nodes that takes 15 minutes to travel and each worker node can handle 60% of the predicted future workload. In this example, the first moving server containerized application cluster selects multiple worker nodes from second and third peer moving server containerized application clusters. Other strategies can be used to select an optimal cluster and/or worker node, for example, based on the need.

The first moving server containerized application cluster sends confirmation to the peer cluster to release one or more worker nodes once the optimal selection of cluster is done. In some embodiments, for security purposes, an authorization to join token can also be sent along with the confirmation. In this way, a worker node that migrates to the first moving server containerized application cluster can present the authorization to join token to the cluster before it is added. The following processing can be performed for each of the one or more worker nodes that are selected to join the first moving server containerized application cluster.

A selected worker node in a peer moving server containerized application cluster is drained of any unnecessary data and is instructed to join the first moving server containerized application cluster. At 422, for example, the peer cluster (e.g., identified as optimal peer cluster from which to take one or more worker nodes) drains the worker node of any data that would not be needed for its functioning at the target location (e.g., where the first cluster is located). At 424, the peer cluster releases the worker node. At 426, the selected worker node (e.g., drained and released) travels to the requested location, and e.g., presents the token to the first moving server containerized application cluster, e.g., a control plane or like control node of the first moving server containerized application cluster, for authentication. At 428, the selected worker node joins the first cluster. Joining the cluster may involve the following.

A selected worker node's node-level agent, in charge of running pod requirements, managing resources, and ensuring cluster health, starts a discovery process, by contacting an application programming interface (API) using a provided API server address associated with the first moving server containerized application cluster.

Upon successful authorization, the selected worker node receives the necessary configuration details from the API server. This includes the first moving server containerized application cluster's network settings, Transport Layer Security (TLS) certificates, and other required information. Control plane or like control node the first moving server containerized application cluster updates the first moving server containerized application cluster's internal state, including adding the selected worker node to the list of available nodes. Control plane or like control node of the first moving server containerized application cluster also begins scheduling workloads onto the selected worker node.

Once the selected worker node is added to the first moving server containerized application cluster, the selected worker node reports its status to the control plane or the like. The control plane marks the selected worker node as ready, and the selected worker node becomes eligible to receive and run workloads. The selected worker node becomes an active participant in the first moving server containerized application cluster and can accept and execute workloads of the first moving server containerized application cluster.

In some embodiments, adding and removing worker node are done automatically by using container orchestrator provided commands. By way of example, in Kubernetes, deleting a node from a cluster can be performed by: Drain worker node so that the worker node would not impact workload ($kubectl drain-ignore --daemonsets --force <k8s-worker-node>); Delete the worker node ($kubectl delete node <k8s-worker-node>). By way of example, in Kubernetes, adding a node to cluster can be performed by: Get the token identifier (ID) from a cluster controller node ($kubeadm token create --print-join-command); ($kubeadm join <IP> --token 1642s5 --discovery-token-ca-cert-hash <hash>).

The methods described above can be used for different aspects of a moving server containerized application cluster. For example, the method can be used to help a scheduler of a moving server containerized application cluster in scheduling workload to worker nodes. When there is a need to scale up the replicas of an application or microservice on a moving server containerized application cluster, a scheduler can utilize the method to determine an optimal worker node to which a pod can be assigned. The scheduler can be integrated with a control plane to perform analyses of the computing resource, hardware and energy requirement, to identify the current state, resource availability, energy availability, geographical position of the plurality of worker nodes, and to assign requested pod to an optimal worker node. The methods described herein can also be used in evicting a node from a cluster. For example, during eviction, a suitable worker node can be identified to accept (or to which to migrate) the pods from the worker node getting evicted.

Figure 5:
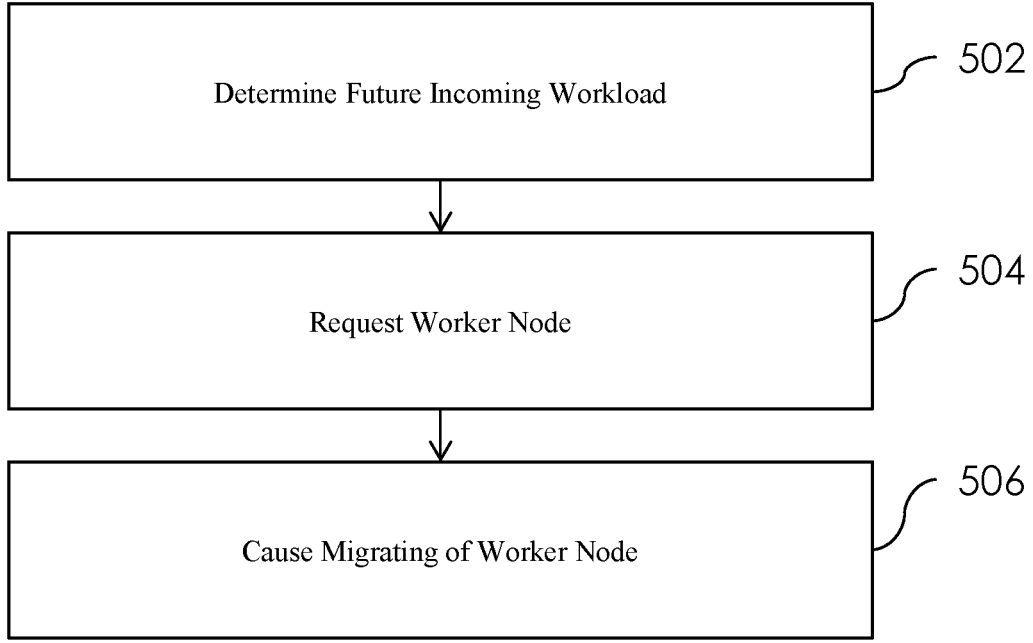
FIG. 5 is another diagram illustrating a method of a moving server containerized application cluster rebalancing its worker nodes in some embodiments.

FIG. 5 is another diagram illustrating a method of rebalancing of moving server containerized application cluster in some embodiments. At 502, a first cluster that is deployed to a target location for providing one or more services determines or predicts its future workload, for example, as also described with reference to 404 in FIG. 4. In some embodiments, a machine learning technique is used to predict the future workload of the first cluster. At 504, the first moving server containerized application cluster requests at least one worker node from a peer moving server containerized application cluster, e.g., as described with reference to 408, 410 and 412 in FIG. 4. At 506, at least one worker node is caused to migrate from the peer moving server containerized application cluster to the first moving server containerized application cluster. For example, responsive to receiving an acknowledgement from the peer moving server containerized application cluster with one or more worker node details (e.g., as described above with reference to 418), the first moving server containerized application cluster identifies or selects at least one worker node considered to be optimal (e.g., as described above with reference to 420). By identifying or selecting at least one worker node from the peer cluster, the first cluster causes the worker node to migrate or travel from its current location to the first cluster's location from its current location. As described above with reference to 424 and 426 in FIG. 4, the worker node travels to a requested location and joins the first cluster.

As described above, a machine learning model determines the future incoming load to the first moving server containerized application cluster and identifies additional resource needed in the first moving server containerized application cluster to service the further incoming load.

Responsive to the requesting at 504, the first moving server containerized application cluster receives an identification of the at least one worker node. For example, as described above with reference to 414 and 416 in FIG. 4, at least one worker node is identified based on evaluating the at least one worker node's current and future load, distance to be travelled between the first moving server containerized application cluster and the peer moving server containerized application cluster, battery remaining in the at least one worker node, energy required to drain the at least one worker node, and at least one hardware pre-requisite.

The first moving server containerized application cluster identifies or selects at least one worker node identified by the peer moving server containerized application cluster, based on at least a hardware pre-requisite, travel distance between the clusters, energy remaining in the at least one worker node to be released by the peer moving server containerized application cluster, and confirms the request to the peer moving server containerized application cluster.

At least one worker node is drained and released from the peer moving server containerized application cluster prior to that worker node physically migrating to the first moving server containerized application cluster.

In some embodiments, the first moving server containerized application cluster requests at least one worker node from multiple peer moving server containerized application clusters. In some embodiments, a plurality of worker nodes migrate from the multiple peer moving server containerized application clusters to the first moving server containerized application cluster.

Figure 6:
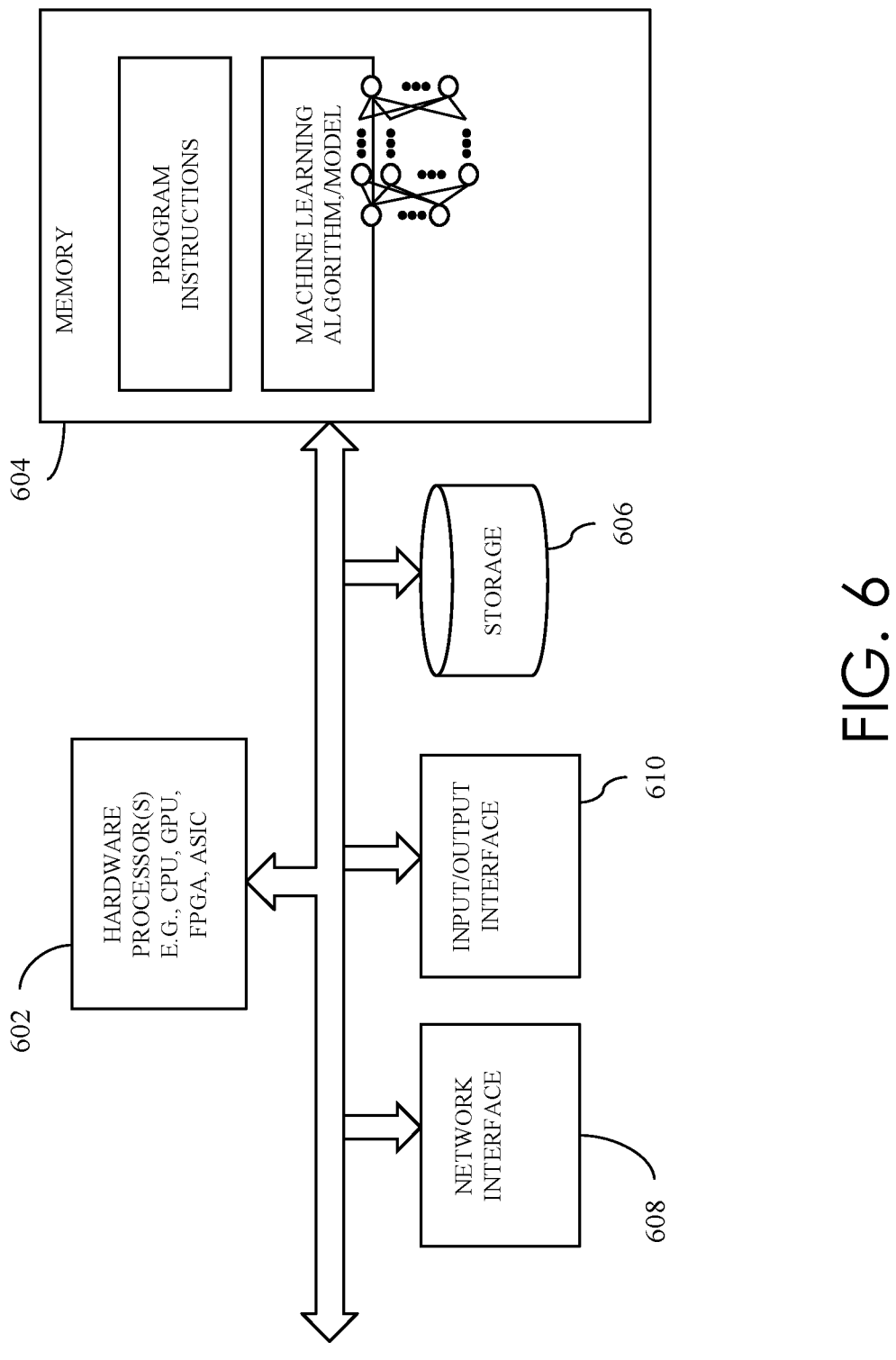
FIG. 6 is a diagram showing components of a system in some embodiments that facilitates dynamic rebalancing of containerized application cluster.

FIG. 6 is a diagram showing components of a system in some embodiments that facilitates dynamic rebalancing of containerized application cluster. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and facilitate dynamic rebalancing of containerized application cluster. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. One or more hardware processors 602 may determine future incoming workload to a first moving server containerized application cluster, request at least one worker node from a peer moving server containerized application cluster, and cause migrating of the at least one worker node from the peer moving server containerized application cluster to the first moving server containerized application cluster. Data may be stored in a storage device 606 or received via a network interface 608 from a remote device, and may be temporarily loaded into a memory device 604, for use by one or more hardware processors 602. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in some embodiments" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   determining future incoming workload to a first moving server containerized application cluster;
   requesting at least one worker node from a peer moving server containerized application cluster; and
   causing migrating of the at least one worker node from the peer moving server containerized application cluster to the first moving server containerized application cluster,
   wherein the first moving server containerized application cluster receives an identification of the at least one worker node, the at least one worker node having been identified based on evaluating the at least one worker node's current and future load, the distance to be travelled between the first moving server containerized application cluster and the peer moving server containerized application cluster, battery remaining in the at least one worker node, energy required to drain the at least one worker node, and at least one hardware pre-requisite.

2. The computer-implemented method of claim 1, wherein a machine learning model determines the future incoming workload to the first moving server containerized application cluster and identifies additional resource needed in the first moving server containerized application cluster to service the future incoming workload.

3. The computer-implemented method of claim 1, wherein the first moving server containerized application cluster selects the at least one worker node identified by the peer moving server containerized application cluster, based on at least a hardware pre-requisite, the distance to be travelled between the first moving server containerized application cluster and the peer moving server containerized application cluster, energy remaining in the at least one worker node to be released by the peer moving server containerized application cluster, and confirms the request to the peer moving server containerized application cluster.

4. The computer-implemented method of claim 1, wherein the at least one worker node is drained and released from the peer moving server containerized application cluster prior to the at least one worker node physically migrating to the first moving server containerized application cluster.

5. The computer-implemented method of claim 1, wherein the first moving server containerized application cluster requests at least one worker node from multiple peer moving server containerized application clusters.

6. The computer-implemented method of claim 5, wherein a plurality of worker nodes migrate from multiple peer moving server containerized application clusters to the first moving server containerized application cluster.

7. A computer program product comprising:
a set of one or more computer-readable storage media;
program instructions, collectively stored in the set of one or more storage media, for causing a processor set to perform the following computer operations:
determine future incoming workload to a first moving server containerized application cluster;
request at least one worker node from a peer moving server containerized application cluster; and
cause migrating of the at least one worker node from the peer moving server containerized application cluster to the first moving server containerized application cluster,
wherein the first moving server containerized application cluster receives an identification of the at least one worker node, the at least one worker node having been identified based on evaluating the at least one worker node's current and future load, the distance to be travelled between the first moving server containerized application cluster and the peer moving server containerized application cluster, battery remaining in the at least one worker node, energy required to drain the at least one worker node, and at least one hardware pre-requisite.

8. The computer program product of claim 7, wherein a machine learning model determines the future incoming workload to the first moving server containerized application cluster and identifies an additional resource needed in the first moving server containerized application cluster to service the future incoming workload.

9. The computer program product of claim 7, wherein the first moving server containerized application cluster selects the at least one worker node identified by the peer moving server containerized application cluster, based on at least a hardware pre-requisite, the distance to be travelled between the first moving server containerized application cluster and the peer moving server containerized application cluster, energy remaining in the at least one worker node to be released by the peer moving server containerized application cluster, and confirms the request to the peer moving server containerized application cluster.

10. The computer program product of claim 7, wherein the at least one worker node is drained and released from the peer moving server containerized application cluster prior to the at least one worker node physically migrating to the first moving server containerized application cluster.

11. The computer program product of claim 7, wherein the first moving server containerized application cluster requests at least one worker node from multiple peer moving server containerized application clusters.

12. The computer program product of claim 11, wherein a plurality of worker nodes migrate from the multiple peer moving server containerized application clusters to the first moving server containerized application cluster.

13. A computer system comprising:
a processor set;
a set of one or more computer-readable storage media;
program instructions, collectively stored in the set of one or more computer-readable storage media, for causing the processor set to perform the following computer operations:
determine future incoming workload to a first moving server containerized application cluster;
request at least one worker node from a peer moving server containerized application cluster; and
cause migrating of the at least one worker node from the peer moving server containerized application cluster to the first moving server containerized application cluster,
wherein the first moving server containerized application cluster receives an identification of the at least one worker node, the at least one worker node having been identified based on evaluating the at least one worker node's current and future load, the distance to be travelled between the first moving server containerized application cluster and the peer moving server containerized application cluster, battery remaining in the at least one worker node, energy required to drain the at least one worker node, and at least one hardware pre-requisite.

14. The system of claim 13, wherein a machine learning model determines the future incoming workload to the first moving server containerized application cluster and identifies an additional resource needed in the first moving server containerized application cluster to service the future incoming workload.

15. The system of claim 13, wherein the first moving server containerized application cluster selects the at least one worker node identified by the peer moving server containerized application cluster, based on at least a hardware pre-requisite, the distance to be travelled between the first moving server containerized application cluster and the peer moving server containerized application cluster, energy remaining in the at least one worker node to be released by the peer moving server containerized application cluster, and confirms the request to the peer moving server containerized application cluster.

16. The system of claim 13, wherein the at least one worker node is drained and released from the peer moving server containerized application cluster prior to the at least one worker node physically migrating to the first moving server containerized application cluster.

17. The system of claim 13, wherein the first moving server containerized application cluster requests at least one worker node from multiple peer moving server container- ized application clusters.

\* \* \* \* \*